(12) United States Patent
Wu et al.

(10) Patent No.: US 9,152,812 B2
(45) Date of Patent: Oct. 6, 2015

(54) SENSITIVE DATA PROTECTION DURING USER INTERFACE AUTOMATION TESTING SYSTEMS AND METHODS

(71) Applicant: EBAY INC., San Jose, CA (US)

(72) Inventors: Junlong Wu, Shanghai (CN); Jun Han, Shanghai (CN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/095,297

(22) Filed: Dec. 3, 2013

(65) Prior Publication Data

US 2015/0154415 A1 Jun. 4, 2015

(51) Int. Cl.
G06F 21/62 (2013.01)

(52) U.S. Cl.
CPC .................................. *G06F 21/6209* (2013.01)

(58) Field of Classification Search
None
See application file for complete search history.

(56) References Cited

U.S. PATENT DOCUMENTS

| 6,931,532 B1 * | 8/2005 | Davis et al. ................... 713/167 |
| 2004/0078577 A1 * | 4/2004 | Feng et al. ..................... 713/182 |
| 2005/0091499 A1 * | 4/2005 | Forlenza et al. ............... 713/176 |
| 2005/0235165 A1 * | 10/2005 | Gomez et al. ................. 713/193 |

OTHER PUBLICATIONS

Maruyama et al., Element-Wise XML Encryption, IBM Research, 2000.*
Singh et al., Secure Payment Information Using XML Technology, IJARCSSE, 2012.*

* cited by examiner

*Primary Examiner* — Minh Dinh
(74) *Attorney, Agent, or Firm* — Haynes and Boone, LLP

(57) ABSTRACT

There is provided systems and method for sensitive data protection during user interface automation testing. A user may transmit sensitive data to the test website framework, where the sensitive data is encrypted as a data key. The encrypted data key is set by an administrator of the test website and given to the user. The user may enter the key, where the test website framework application utilizes a conversion kit to decrypt the encrypted data key for use in the website user interface automation test. However, the encrypted data key is pulled into a version control system and/or viewed in test results so that the sensitive data remains hidden from view. In various embodiments, the encrypted data key may be entered into a web element, such as a password field, where the password field displays only the encrypted data key during test results.

18 Claims, 4 Drawing Sheets

SENSITIVE DATA PROTECTION DURING USER INTERFACE AUTOMATION TESTING SYSTEMS AND METHODS

BACKGROUND

1. Technical Field

The present application generally relates to protection of sensitive data during user interface automation testing and more particularly to receiving an encrypted data key corresponding to sensitive data from a test user during a web user interface automation test so that the sensitive data remains hidden to viewers of a data report corresponding to the web user interface automation test.

2. Related Art

During web user interface automation test, test executors (e.g. users of the test website) may require the use and/or transmission of sensitive data into the test framework. The sensitive data may appear in a test data file contained with a version control system (VCS) and/or visible to code authors viewing results of the test framework. For example, sensitive data may be pulled into the VCS and the test file may be required to be shared with the public and/or viewed by code authors not authorized to view and/or use the sensitive data. Thus, test executors data is not protected from public inspection. Test executors may manually run cases directly with the test website instead of through the test framework, however, large resource are required to manage the test data that is not stored in the VCS and/or managed by the test framework. Other test frameworks may require the test executors to enter sensitive data, for example user names and/or passwords, into web elements where users and/or code authors may view the sensitive data in test data files and/or test results. Thus, test executors data is visible to unauthorized parties.

Figure 1:
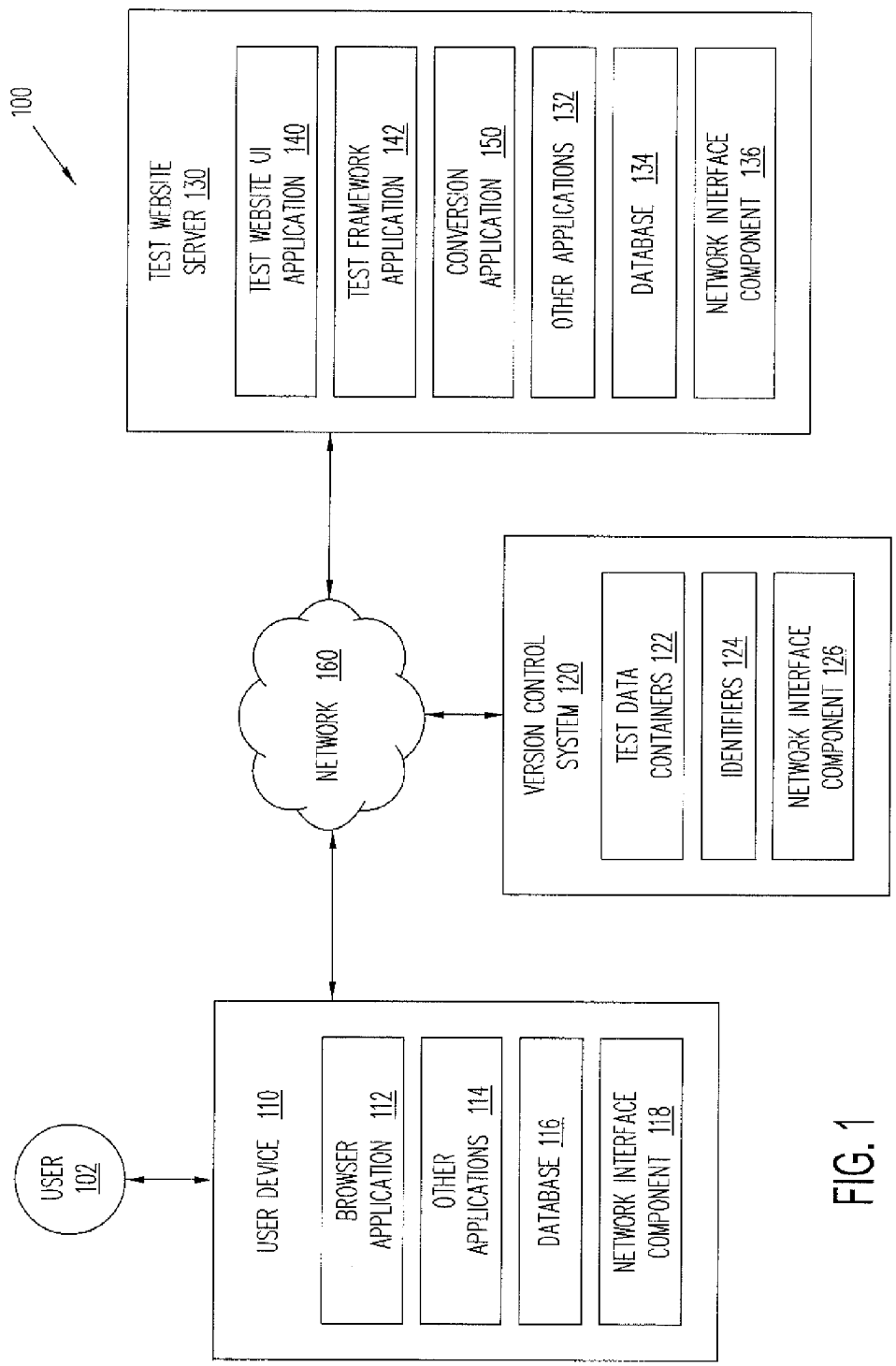
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In various embodiments, a user, such as a test executor of a test website, may wish to transmit sensitive data to the test website for use by a test framework application performing website user interface (UI) automation tests. The user may receive an encrypted data key corresponding to the sensitive data. For example, the sensitive data may be encrypted using an encryption algorithm and key held by an administrator of the test framework. The encryption algorithm may correspond to an RSA algorithm having a public key held by the test administrator. The user may transmit the encrypted data key to the test website for use in the test framework. When transmitting the encrypted data key to the test framework, the encrypted data key may be transmitted in a test data file for an execution of a website user interface test. The test data file may be stored to a version control system (VCS), where various public users, executors, administrators, and code authors may view the test data file. However, in the test data file the encrypted data key is visible and the clear text for the sensitive data remains hidden. In various embodiments, the encrypted data key may be entered into a web element instead, such as a password field, where a corresponding test data file and/or test results for the website UI automation test displays only the encrypted data key.

The test website framework application utilizes a conversion kit to decrypt the encrypted data key for use in the website user interface automation test. Where the encrypted data key is entered to a web element, the test framework may determine if the user is in a production environment, and utilize the conversion kit to decrypt the encrypted data key. However, the web element and test data file/test results show the encrypted data key and not the clear text of the sensitive data in the test data file. The conversion kit may look up the encrypted data key in a cipher mapping file, where the cipher mapping file may correspond to an extensible markup language (XML) or comma separated value (CSV) file having key-value pairs. Each key represents an encrypted data key, where each value represents a corresponding cipher text created from encryption of the sensitive data. The cipher mapping file allows users and/or administrators to utilize a smaller "key" to enter to the test framework instead of the long cipher text.

Once the conversion kit recovers the cipher text, the conversion kit may utilize a corresponding encryption algorithm, such as an RSA algorithm, and a public key held in the cipher mapping file to decrypt the cipher text and recover the clear text. The clear text may then be utilized by the test framework to execute a website UI automation test. Additionally, the encrypted data key may be recorded in test results and/or a test data file so sensitive data remains hidden.

FIG. 1 is a block diagram of a networked system 100 suitable for implementing the process described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a version control system 120, and a test website server 130 in communication over a network 160. User 102, such as a test executor of a test website, may utilize user device 110 while engaging in and/or transmitting data for a website UI automation test. In certain embodiments, test website server 130 may receive test data, such as test data files including encrypted data keys, from user 102 through user device 110. Additionally, test data files may be stored to version control system 120 for public inspection and user in website UI automation tests.

User device 110, version control system 120, and test website server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication with version control system 120 and/or test website server 130. For example, user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may be utilized.

User device 110 of FIG. 1 contains a browser application 112, other applications 114, a database 116, and a network interface component 118. Browser application 112 and other applications 114 may correspond to processes, procedures, and/or applications executable by a hardware processor, for example, a software program. In other embodiments, user device 110 may include additional or different software as required.

Browser application 112 may be used, for example, to provide a convenient interface to permit a user to access the Internet including version control system 120 and/or test website server 130. In one embodiment, browser application 112 may be implemented as a web browser configured to view information available over the Internet, for example, accessing a website. Browser application 112 may be configured to transmit and receive data of network 160, including receiving webpages and displaying the webpages to user 102, and transmitting user input corresponding to the webpages. In this regard, browser application 112 may display test webpages for a website corresponding to test website server 130 to user 102. Browser application 112 may receive user input from user 102 corresponding to the webpages. In various embodiments, the user input may correspond to test data, including encrypted data key(s) corresponding to sensitive data. Encrypted data keys may be received from direct input of user 102 and/or from stored data in database 116. The test data including the encrypted user key(s) may be transmitted to test website server 130, for example, if a test data file is transmitted to test website server 130 and/or one or more encrypted data key is entered to a web element on a webpage of test website server 130.

Browser application 112 may further be utilized to transmit test data to version control system 120 for storage in a test data file. A test data file may correspond to a data container including test data for entry into a test framework for a website UI automation test. The test data file included in the data container may include encrypted data key(s) corresponding to sensitive data. In various embodiments, browser application 112 may be utilized to receive other information, such encrypted data keys from an administrator of test website server 130 and/or website user interface test information from test website server 130.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160, including for establishment, receipt, and/or verification of encrypted data keys used by test website server 130. Other applications 114 may contain other software programs, executable by a processor, including a graphical user interface (GUI) configured to provide an interface to the user.

User device 110 may further include database 116 which may include, for example, identifiers such as operating system registry entries, cookies associated with browser/credit application 112 and/or other applications 114, identifiers associated with hardware of user device 110, or other appropriate identifiers, such as identifiers used for user/device authentication or identification. In one embodiment, identifiers in database 116 may be used by version control system 120 and/or test website server 130.

In various embodiments, database 116 may further contain user information or may include data to access user information. Thus, database 116 may contain further user personal information (e.g. a name, social security number, user financial information, or other identifying information), a user account identifier, and a user device identifier. In various embodiments, database 116 may include online account access information. Database 116 may include encrypted data key(s) transmitted from a system administrator of test website server 130 and stored with user device 110. In various embodiments, database 116 may include additional information, such as a portion or all of a cipher mapping file having key-value pairs corresponding to encrypted data key(s) and cipher text.

In various embodiments, user device 110 includes at least one network interface component 118 adapted to communicate with version control system 120 and/or test website server 130. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Version control system 120 may be maintained, for example, by an online and/or offline version control system offering revision/version/source control applications and/or features. Generally, version control system 120 may control the management of changes to documents, data, computer programs, websites, and/or other collections of information. In this regard, version control system 120 may include one or more applications to retain test data in one or more test data containers enabling code authors of test website server 130's website and/or user interfaces to view the test data in an organized and collected set. Thus, version control system 120 may be configured to interact with user device 110 and/or other user devices to receive test data. Additionally, version control system 120 may be configured to interact with test website server 130 for the storage of test data and/or the transmission of test data files to test website server 130.

Version control system 120 may be implemented using any appropriate hardware and software configured for wired and/or wireless communication with user device 110 and/or test website server 130. For example, version control system 120 may be implemented as a single or networked personal computer (PC), a smart phone, personal digital assistant (PDA), laptop computer, and/or other types of computing devices capable of transmitting and/or receiving data. Although a single version control system is shown, a plurality of version control systems may be utilized.

Version control system 120 includes test data containers 122, identifiers 124, and a network interface component 126. Version control system may include processes, procedures, and/or applications executable by a hardware processor, for example, a software program, necessary for storage of test data containers 122 and/or identifier 124. In other embodiments, version control system 120 may include additional or different software as required Test data containers 122 may correspond to a data structure for storing objects in an organized way and with specific access rules. Test data containers 122 may include test data files having encrypted data key(s) from user 102. Test data containers 122 may include one or more test data files and may organize and/or limit access rights to one or more of the test data files. Each of test data containers 122 may correspond to a single test data instance or may correspond to a collection of test data, for example from a particular test executor (e.g. user 102), test version (e.g. website UI version), or other categorizing event. Additionally, the data container may include additional information as necessary by a test website server 130 to store and categorize test data files for use by a test framework in a website UI automation test.

Version control system 122 includes identifiers 124 used with test data containers 122 and/or associated with user 102 including user device 110. For example, identifiers 122 may include identifiers identifying an entity of origin of a test data file and/or test data container, a time or origin, and/or other identifying information. Identifiers 124 may include data necessary for test website server 130 to match test data files with user 102, such as an identifier of user device 110 and/or user 102. Thus, identifiers may enable test website server 130 to identify an author of a test data file including an encrypted data key and a holder of the encrypted data key.

In various embodiments, version control system 120 includes at least one network interface component 126 adapted to communicate with user device 110 and/or test website server 130. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Test website server 130 may be maintained, for example, by an online entity establishing a test website having a user interface. In this regard, test website server 130 includes one or more processing applications which may be configured to interact with user device 110 and/or version control system 120 to facilitate the testing of a website UI. Test website server 130 may include a test website UI and a test framework enabling test data to be run through the test website UI. Thus, test website server 130 may be maintained by any entity wishing to perform a website UI automation test. Although test website server 130 is described as separate from version control system 120, it is understood that test website server 130 may include one or more version control system(s) 120.

Test website server 130 of FIG. 1 includes a test website UI application 140, a test framework application 142, a conversion application 150, other applications 132, a database 134, and a network interface component 136. Test website UI application 140, test framework application 142, conversion application 150, and other applications 132 may correspond to processes, procedures, and/or applications executable by a hardware processor, for example, a software program. In other embodiments, test website server 130 may include additional or different software as required.

Test website UI application 140 may provide a user interface application of a test website. Test website UI application may correspond to one or more UI displayable to user 102, for example, using browser application 112. In this regard, test website UI application 140 provides an interface for interactions between user 102 and test website server 130 through browser application 112. Test website UI application 140 may receive user input and output results to user 102. For example, test website UI application 140 may display a webpage of test website server 130, and accept user input corresponding to manipulation of the webpage by user 102. Test website UI application 140 may output results of the manipulation to user 102.

Test website UI application 140 may receive data input from user 102, for example, user login, user information entry, or user selections of options, interactions, and links available in test website UI application 140. However, user input may correspond to sensitive information in various embodiments. Thus, during website UI automation tests, test framework application 142 may utilize conversion application 150 to prevent leakage of sensitive information during UI automation tests of test website UI application 140, as discussed herein.

Test framework application 142 may correspond to an application including a set of processes to provide support to automated testing of test website UI application 140. For example, test website UI application 140 may correspond to a test UI of a website, where test executors, such as user 102, provide test data to code authors in order to test the UI. Test framework application 142 may receive test data and map the test data to test website UI application 140 in order to receive the results. Thus, test framework application 142 may generate UI events from test data contained in a test data file for use with test website UI application 140. Test framework application 142 may enable a code author, system administrator of test website server 130, or other reviewing party to observe and validate the behavior of test website UI application 140 using an automation test.

Test framework application 142 may require sensitive data for test website UI application 140 in various embodiments. For example, test website UI application 140 may include web elements requiring input of sensitive data, such as a user name and/or password field of a login request, stored in test data files for use in a website UI automation test. Sensitive data may correspond to user names, passwords, social security numbers, personal information (e.g. phone numbers, email address, physical address, driver license number, etc.), or user financial information (e.g. credit/debit card numbers, checking/savings accounts, etc.). Thus, user 102 may wish to prevent other user from viewing the sensitive data.

In order to hide the sensitive data in test data files, user 102 may utilize one or more encrypted data key corresponding to the sensitive data. The encrypted data key may be part of a key-value pair, where the value is cipher text of the sensitive data encrypted using an encryption algorithm and symmetric/asymmetric key. A test administrator may determine the encrypted data key and the cipher text, and transmit the encrypted data key to user 102 for use with web UI automation tests for test website server 130. Thus, test framework application 142 may receive one or more encrypted data key(s) in web element(s) and/or in a received test data file for an automation test of test website UI application 140. In order to perform an automation test of test website UI application 140, the test framework application 142 may utilize conversion application 150.

Conversion application 150 may correspond to an application including a conversion kit for decrypting one or more encrypted data key(s) into a corresponding clear text which may then be utilized with test website UI application 140 and test framework application 142 to run a website UI automation test. Thus, conversion application 150 may include the conversion kit having a cipher mapping file and an encryption algorithm. The encryption algorithm may be chosen by a system administrator, and, in various embodiments, correspond to an RSA algorithm. The encryption algorithm may include a corresponding symmetric public key or may include a corresponding asymmetric key pair, where the public and private keys may be held by one or more of a system administrator and/or user 102.

Conversion kit of conversion application 150 may also include a cipher mapping file. The cipher mapping may include the symmetric and/or asymmetric key(s) for the encryption algorithm. Additionally, the cipher mapping file may include the encrypted data key, where the encrypted data key correspond to a short identifier. The cipher mapping file may include key-value pairs, where the key correspond to each encrypted data key and the value corresponds to the matching cipher text. The matching cipher text is cipher text of sensitive data after being encrypted using the encryption algorithm. As cipher text normally corresponds to a very long string, the encrypted data key is used for user convenience to identify the cipher text. Thus, the encrypted data key may be used by user 102 instead of a long string of cipher text.

Conversion application 150 returns clear text by looking up the encrypted data key(s) in the test data file using the cipher mapping file. Once the cipher text matching the encrypted data key is found, conversion application 150 may utilize the encryption algorithm and public key to return clear text by decrypting the cipher text. The clear text may then be utilized by test framework application 142 when performing web UI automation tests of test website UI application 140. However, the test data file only displays the encrypted data key and the encrypted data key is entered to web elements to prevent revealing sensitive data to other users.

In various embodiments, test website server 130 includes other applications 132 as may be desired in particular embodiments to provide features to test website server 130. For example, other applications 132 may include security applications for implementing server-side security features, programmatic server applications for interfacing with appropriate application programming interfaces (APIs) over network 160, or other types of applications. Other applications 132 may contain software programs, executable by a processor, including a graphical user interface (GUI), configured to provide an interface to a user.

Additionally, test website server 130 includes database 134. Database 134 may be protected to prevent unauthorized views of protected personal and/or sensitive information. Database 134 may include user information, such as name, address, birthdate, payment/funding information, additional user financial information, and/or other desired user data. User information may be linked to a user account, such as a user name and/or password. The user name and/or password may be utilized by a system administrator of test website server 130 with sufficient access privileges to establish one or more encrypted data key(s). In other embodiments, user 102 may not have previously established a user account and other sensitive data may be stored in database 134 and/or utilized for encrypted data key(s).

In various embodiments, database 134 stores data for test framework application 142 including test data files. Additionally database 134 may store test results, including test results displaying encrypted data keys. Database 134 may further store data for conversion application 150, including the conversion kit having a cipher mapping file and an encryption algorithm.

In various embodiments, test website server 130 includes at least one network interface component (NIC) 136 adapted to communicate with network 160 including user device 110 and/or version control system 120. In various embodiments, network interface component 136 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
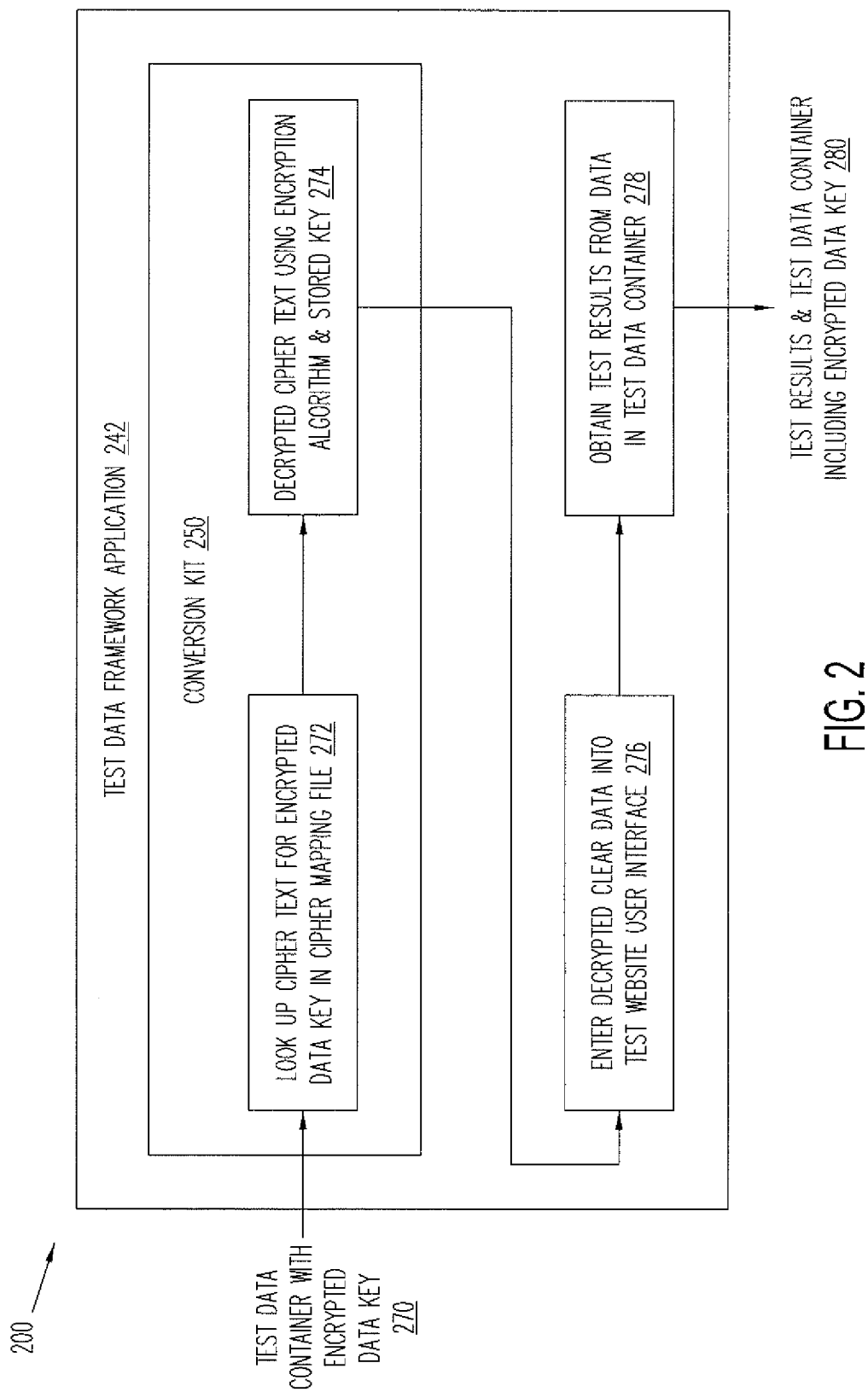
FIG. 2 is an exemplary test framework application environment utilizing a conversion kit to receive and decrypt encrypted data keys in a test data container, according to an embodiment.

FIG. 2 is an exemplary test framework application environment utilizing a conversion kit to receive and decrypt encrypted data keys in a test data container, according to an embodiment. Test environment 200 shows a test data framework application 242 utilizing a conversion kit 250 on a test data container having encrypted data key(s). Thus, test data framework application 242 and conversion kit 250 may correspond generally to test framework application 142 and conversion application 150, respectively, of FIG. 1.

Test data container with an encrypted data key may be received at 270 by test data framework application 242. As previously discussed, a test data container may include one or more test data files each having one or more encrypted data key(s). A test data container may correspond to one or more test data instances from a user or for a particular version of a website user interface. Thus, the test data container may include test data for execution by test data framework application 242 using a websites user interface. However, the website UI automation test executed by test data framework application 242 may require conversion kit 250 to return clear text for use in the website UI automation test. An exemplary test data file having encrypted data keys is displayed in Table 1.

TABLE 1

| TestObject. TestCaseId | TestObject. TestMethod | TestObject. TestTitle | TestObject. TestSite | User.Email | User. Password |
|---|---|---|---|---|---|
| 1 | testSignIn | test sign in | US | us#user1 | us#password |

As can be seen, test data file contains a login attempt for a website UI automation test. The User.Email and User.Password fields include encrypted data keys of us#user1 and us#password instead of clear text of the user's email and password. Thus, test data framework application 242 utilizes conversion kit 250 to look up cipher text for an encrypted data key in a cipher mapping file at 272. Conversion kit 250 includes the cipher mapping file having key-value pairs corresponding to encrypted data key-cipher text pairs. Using the cipher mapping file, conversion kit may return cipher text corresponding to encrypted sensitive data a user wishes to remain hidden in test data files/containers. The cipher mapping file may correspond to a XML file, a CSV file, or other structured file displaying key-value pairs. For example, Table 2 shows a portion of a potential cipher mapping file.

TABLE 2

| Encrypted Data Key | Cipher Text | Is Valid? |
|---|---|---|
| us#user1 | 0AA2932A1AB5DDC4D32B38863B69BF9D1D4C8C14001 CE00CC860555220BA24EA05033F469AEEF98CB62F10D 9E41A8F172177A1289A44739CF11F504821E0F09B | TRUE |
| us#user2 | 320B8E59DA83BD4C1C6494EA910C8F1AC98C80D409D 682483CF8DB4B4DD281D257FAEB61174E7D2A6259E2C 05901685B75C0F280234C5225F6C012BF540956EB | TRUE |
| us#password | 419BA527E0D7C442F5EBBD9AE11AB49000BAD948E31 B060EC27FDF868D58033A9B1293D38DCA6652BF4E938 59FDF70DD66421E8CDF42F6B580237CE6F0E16229 | TRUE |

Thus, at 272, the cipher texts corresponding to us#user 1 and us#password are returned. The cipher test is decrypted using an encryption algorithm of conversion kit 250 and a stored key in the cipher mapping file. The encryption algorithm may correspond to an RSA algorithm with a symmetric public key stored in the cipher mapping file. Thus, conversion kit 250 returns clear text from the cipher text at 274 for use by test data framework application 242.

The decrypted clear data is entered into the test websites user interface by test data framework application 242 at 276. Test data framework application 242 may execute a web UI automation test by utilizing test data container with a website UI. The decrypted clear data may be entered during the automation test however remain hidden from view of users viewing the results of the website UI automation test and/or the test data file(s) in the test data container. Test data framework application 242 may obtain test results from the website UI automation test at 278 and report the test results with the test data container including the encrypted data key at 280. Thus, system administrators, code authors, and other users viewing test results of a web UI automation test may view test files and/or test results without viewing sensitive data.

Figure 3:
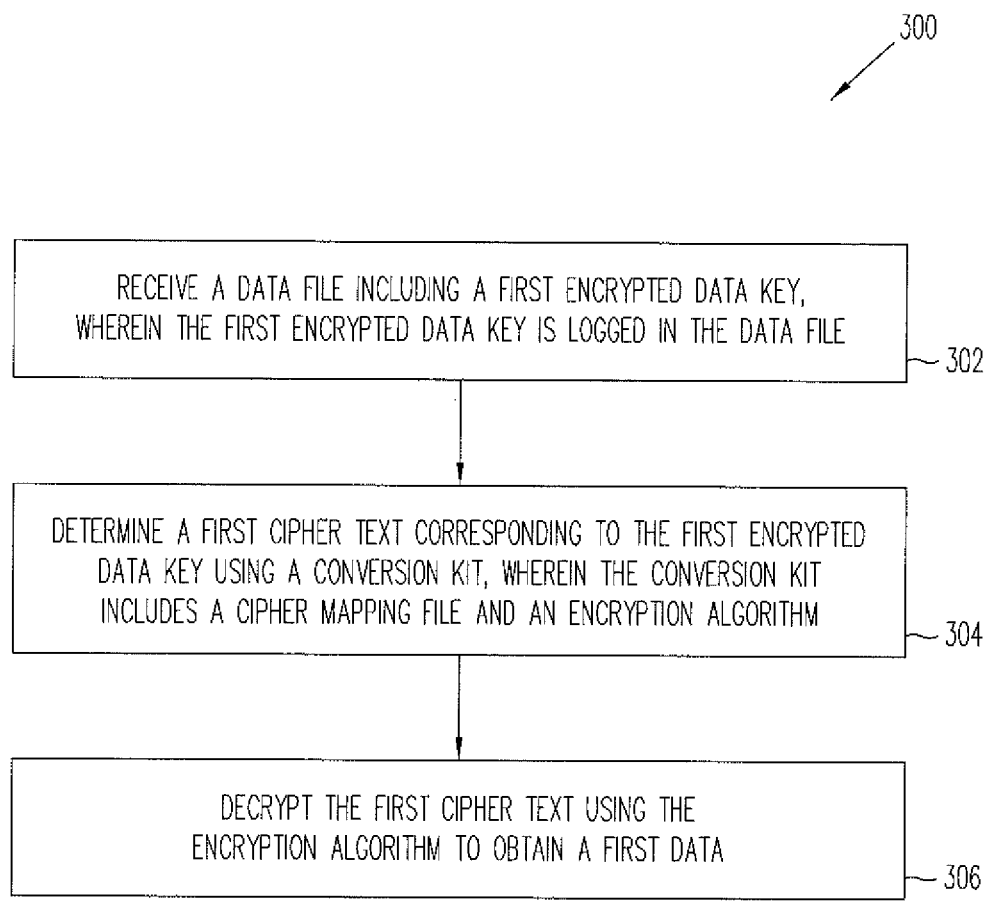
FIG. 3 is a flowchart of an exemplary process for receiving encrypted data keys and decrypting the encrypted data keys using a conversion kit, according to an embodiment.

FIG. 3 is a flowchart of an exemplary process for receiving encrypted data keys and decrypting the encrypted data keys using a conversion kit, according to an embodiment. Note that one or more steps, processes, and methods described herein may be omitted, performed in a different sequence, or combined as desired or appropriate.

At step 302, a data file including a first encrypted data key is received, wherein the first encrypted data key is logged in the data file. The data file may correspond to a test data file, therefore, the first encrypted data key may be logged in the data file for a website user interface automation test. The data file may be transmitted by a user device and and/or a version control system (VCS). For example, a user device may transmit the data file for execution in a website UI automation test. However, in other embodiments the VCS includes one or more data containers having data files. The VCS may receive data files from the user device, or may receive data files after entry of an encrypted data key during use of a test website UI by a user. The data file may be viewed by a party other than the user transmitting the data file. Thus, the first encrypted data key is visible in the data file instead of the corresponding sensitive data. The first encrypted data key may correspond to a key identifying an encrypted user name, password, and/or other sensitive data (e.g. financial data, personal data, etc.). The encrypted sensitive data may be cipher text of the sensitive data. In various embodiments, the first encrypted data key may be entered to a web element of the website UI prior to logging the first encrypted data key in the data file. Once the test website server receives the data file and/or a data container including one or more data files, the test website server may run a website UI automation test.

A test website server may run a website UI automation test be utilizing a test framework with the data file on a website UI. Thus, the test framework requires the use of data in the data file for input into various elements of the website UI. Where the data file includes encrypted data keys, the test framework utilizes a conversion kit to determine clear text for input to the website UI. At step 304, a first cipher text corresponding to the first encrypted data key is determined using a conversion kit, wherein the conversion kit includes a cipher mapping file and an encryption algorithm. The cipher mapping file may include a key-value pair list, where the key corresponds to each of a plurality of encrypted data keys, and the value corresponds to each of a plurality of matching cipher text. Thus, the conversion kit may determine the cipher text corresponding to the encrypted data key by looking up the cipher text in the cipher mapping file.

The conversion kit also includes an encryption algorithm corresponding to the first cipher text. Thus, at step 306, the first cipher text is decrypted using the encryption algorithm to obtain a first data. In various embodiments, the encryption algorithm may correspond to an RSA algorithm. The first data may correspond to clear text of the sensitive data, such as the user name, password, and/or other sensitive data. The first data may then be utilized with a test framework to run a website UI automation test and obtain test results. However, the encrypted data key is only visible in the test data file, and not the clear text, preventing leakage of the clear text.

Figure 4:
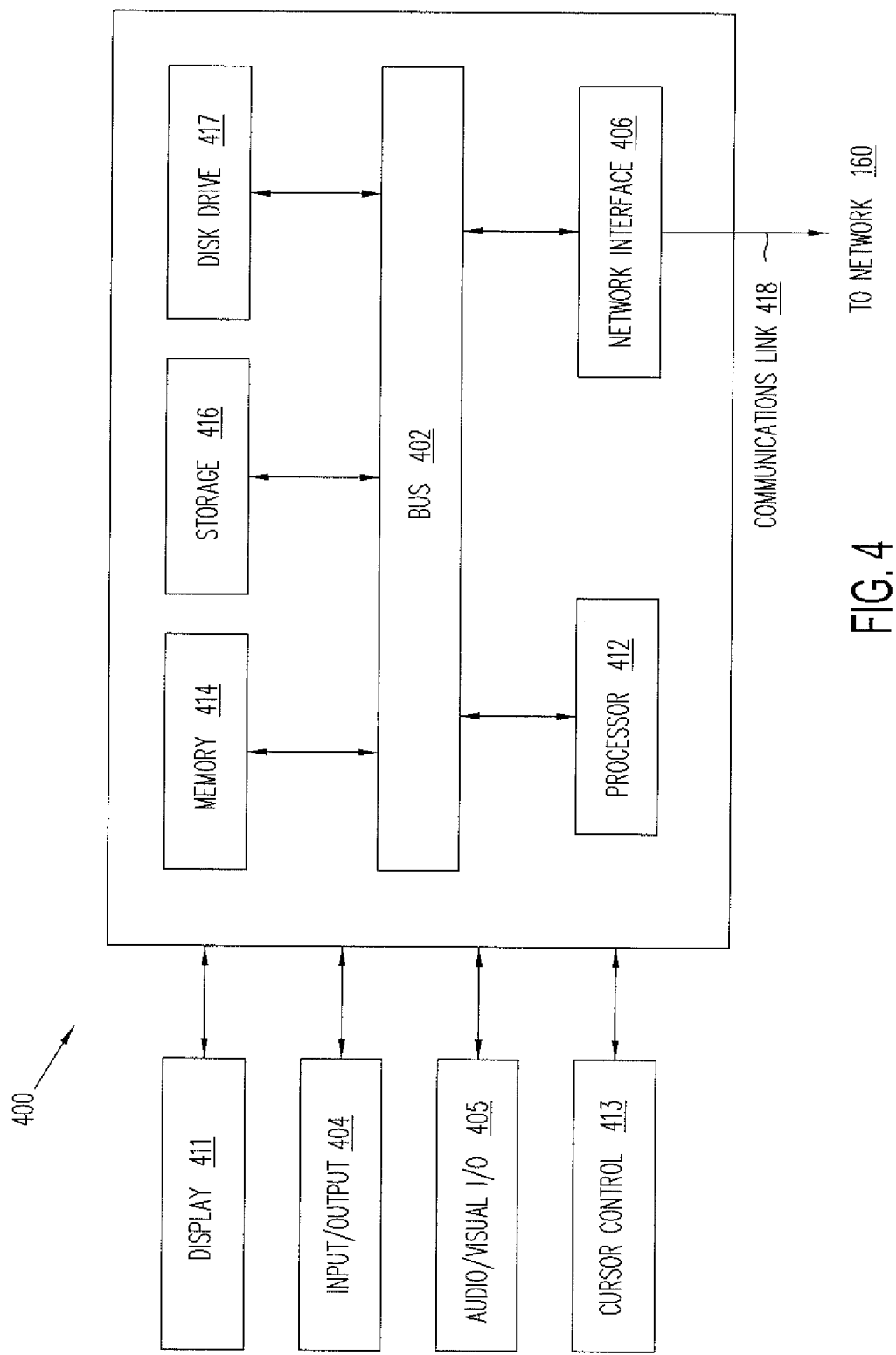
FIG. 4 is a block diagram of a computer system suitable for implementing one or more components in FIG. 1, according to an embodiment.

FIG. 4 is a block diagram of a computer system 400 suitable for implementing one or more embodiments of the present disclosure. In various embodiments, the user device may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a service provider server via network 160. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above description has focused on test data and testing systems; however, features described herein may also apply to other situations where sensitive data may advantageously be masked or hidden. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:

a non-transitory memory storing user account information, wherein the user account information comprises encrypted user information; and one or more hardware processors in communication with the non-transitory memory and configured to:

receive a data file including a first encrypted data key, wherein the first encrypted data key is logged in the data file, and wherein the data file is a test data file for a website user interface automation test;

determine a first cipher text corresponding to the first encrypted data key using a conversion kit, wherein the conversion kit includes a cipher mapping file and an encryption algorithm; and decrypt the first cipher text using the encryption algorithm to obtain a first data.

2. The system of claim 1, wherein the first encrypted data key is visible in the data file.

3. The system of claim 1, wherein the first encrypted data key is entered into a web element prior to logging the first encrypted data key in the data file.

4. The system of claim 1, wherein the data file is stored by a version control system.

5. The system of claim 1, wherein the cipher mapping file include a key-value pair list corresponding to a plurality of encrypted data keys and a plurality of matching cipher text.

6. The system of claim 5, wherein the cipher mapping file determines the first cipher text.

7. The system of claim 1, wherein the first data corresponds to one of a user name, a password, and a user sensitive data.

8. The system of claim 1, wherein the encryption algorithm corresponds to an RSA algorithm.

9. A method comprising:
receiving a data file including a first encrypted data key, wherein the first encrypted data key is logged in the data file, and wherein the data file is a test data file for a website user interface automation test;
determining a first cipher text corresponding to the first encrypted data key using a conversion kit, wherein the conversion kit includes a cipher mapping file and an encryption algorithm; and
decrypting, using one or more hardware processors of a website server, the first cipher text using the encryption algorithm to obtain a first data.

10. The method of claim 9, wherein the first encrypted data key is visible in the data file.

11. The method of claim 9, wherein the first encrypted data key is entered into a web element prior to logging the first encrypted data key in the data file.

12. The method of claim 9, wherein the test data file is stored by a version control system.

13. The method of claim 9, wherein the cipher mapping file include a key-value pair list corresponding to a plurality of encrypted data keys and a plurality of matching cipher text.

14. The method of claim 13, wherein the cipher mapping file determines the first cipher text.

15. The method of claim 9, wherein the first data corresponds to one of a user name, a password, and a user sensitive data.

16. The method of claim 9, wherein the encryption algorithm corresponds to an RSA algorithm.

17. A non-transitory computer readable medium comprising a plurality of machine-readable instructions which when executed by one or more processors of a server are adapted to cause the server to perform a method comprising:
receiving a data file including a first encrypted data key, wherein the first encrypted data key is logged in the data file, and wherein the data file is a test data file for a website user interface automation test;
determining a first cipher text corresponding to the first encrypted data key using a conversion kit, wherein the conversion kit includes a cipher mapping file and an encryption algorithm; and
decrypting the first cipher text using the encryption algorithm to obtain a first data.

18. The non-transitory computer readable medium of claim 17, wherein the first encrypted data key is visible in the data file, and wherein the cipher mapping file include a key-value pair list corresponding to a plurality of encrypted data keys and a plurality of matching cipher text, and wherein the cipher mapping file determines the first cipher text.

* * * * *